United States Patent [19]

Jackson, Jr. et al.

[11] 4,259,478

[45] Mar. 31, 1981

[54] PROCESS FOR PREPARING HIGH MOLECULAR WEIGHT COPOLYESTERS

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 103,805

[22] Filed: Dec. 14, 1979

[51] Int. Cl.³ .............................................. C08G 63/18
[52] U.S. Cl. ..................................... 528/307; 260/2.3; 525/437; 525/444; 528/272; 528/309
[58] Field of Search ........................ 528/272, 307, 309; 260/2.3; 525/437, 444

[56] References Cited

U.S. PATENT DOCUMENTS

| | | | |
|---|---|---|---|
| 3,222,299 | 12/1965 | McDowell | 260/2.3 |
| 3,344,091 | 9/1967 | Russin et al. | 260/2.3 |
| 3,378,402 | 4/1968 | Wiener | 528/307 X |
| 3,427,267 | 2/1969 | Stieger et al. | 260/22 |
| 4,078,143 | 3/1978 | Malik et al. | 260/2.3 |
| 4,079,047 | 3/1978 | Jackson | 528/309 X |
| 4,138,374 | 2/1979 | Currie | 260/2.3 |

*Primary Examiner*—Lucille M. Phynes

*Attorney, Agent, or Firm*—John F. Stevens; Daniel B. Reece III

[57] ABSTRACT

Disclosed is a process for preparing linear, high molecular weight copolyesters from either (A) polyesters or copolyesters, the acid component of which consists of at least 70 mole percent terephthalic acid and the diol component of which consists of at least 70 mole percent ethylene glycol or (B) copolyesters, the acid component of which consists of at least 70 mole percent terephthalic acid and the diol component of which consists of at least 70 mole percent of a mixture of ethylene glycol and 1,4-cyclohexanedimethanol in a mole ratio of from 20:80 to 97:3, the process comprising heating the polymer in the presence of 1,4-cyclohexanedimethanol to glycolize the polymer, distilling out ethylene glycol from the glycolysis mixture, and polycondensing the glycolysis mixture to form a copolyester of which at least a portion of ethylene glycol units are replaced by 1,4-cyclohexanedimethanol units. The process provides a fast polymerization rate and the polymers so produced can be used in the manufacture of plastics, fibers, films and other shaped objects having good physical properties.

10 Claims, No Drawings

PROCESS FOR PREPARING HIGH MOLECULAR WEIGHT COPOLYESTERS

BACKGROUND OF THE INVENTION

1. Field of the Invention

This invention relates to a process for utilizing polyethylene terephthalate, especially scrap polyethylene terephthalate in the production of linear, high molecular weight copolyesters.

The growing demand for polyethylene terephthalate disposable containers such as beverage bottles has created a need to develop uses for scrap polyethylene terephthalate. The present invention provides a process for utilizing polyethylene terephthalate as a reactive intermediate in the production of copolyesters useful in the manufacture of such products as fibers, films, and other shaped objects.

2. Description of the Prior Art

Numerous patents disclose processes for utilizing scrap polyesters in polymer production such as U.S. Pat. Nos. 3,222,999, 3,344,091, 4,078,143 and 4,138,374.

In U.S. Pat. No. 3,222,299 it is stated that reclaimed monomer, obtained by heating waste polymer with glycol, may be injected into the polymerization system but must be kept below a level of about 20% of the total monomer if the polymer produced is to have satisfactory properties. When amounts of recovered monomer higher than about 20% are injected, it is found that the rate of polymerization of the mixture is reduced to such an extent that the output of the equipment must be cut back to a prohibitively low level. In the present process, 100% scrap polyester can be utilized with no loss in properties or polymerization rate. In fact, the polymerization rate is faster than the rate for the preparation of the same copolyesters from dimethyl terephthalate, ethylene glycol, and 1,4-cyclohexanedimethanol.

SUMMARY OF THE INVENTION

The present invention provides a process for preparing linear, high molecular weight copolyesters from either (A) polyesters or copolyesters, the acid component of which consists of at least 70 mole percent terephthalic acid and the diol component of which consists of at least 70 mole percent ethylene glycol or (B) copolyesters, the acid component of which consists of at least 70 mole percent terephthalic acid and the diol component of which consists of at least 70 mole percent of a mixture of ethylene glycol and 1,4-cyclohexanedimethanol in a ratio of from 20:80 to 97:3, the process comprising (1) heating the polymer to a temperature of from about 200° C. to about 290° C. in the presence of about 3 mole percent to an amount equivalent to the mole percent of ethylene glycol of 1,4-cyclohexanedimethanol to glycolize the polymer, (2) distilling out at least a portion of the ethylene glycol from the glycolysis mixture, and (3) polycondensing the glycolysis mixture to form a copolyester of which at least a portion of ethylene glycol units are replaced by 1,4-cyclohexanedimethanol units and the inherent viscosity is at least 0.4.

The process provides a fast polymerization rate and the polymers so produced can be used in the manufacture of plastics, fibers, films and other shaped objects having good physical properties.

DETAILED DESCRIPTION OF THE INVENTION

According to the present invention, a process is provided for preparing linear, high molecular weight copolyesters from either.

(A) polyesters or copolyesters, the acid component of which consists of at least 70 mole percent terephthalic acid and the diol component of which consists of at least 70 mole percent ethylene glycol, or (B) copolyesters, the acid component of which consists of at least 70 mole percent terephthalic acid and the diol component of which consists of at least 70 mole percent of a mixture of ethylene glycol and 1,4-cyclohexanedimethanol in a ratio of from 20:80 to 97:3.

In the first step of the process, the polymer is heated to a temperature of from about 200° C. to about 290° C., in the presence of from about 3 mole percent up to an amount equivalent to the mole percent of ethylene glycol in the polymer, of 1,4-cyclohexanedimethanol to glycolize the polymer. Next, at least a portion of the ethylene glycol is removed from the glycolysis mixture by distillation. Normally, the mixture is heated to a temperature of about 275° C. for about 30 to 60 minutes to accomplish this distillation. In a subsequent step, the glycolysis mixture is polycondensed to form a copolyester of which at least a portion of the ethylene glycol units are replaced by 1,4-cyclohexanedimethanol units and the inherent viscosity has reached at least 0.4.

Polyethylene terephthalate and/or polyethylene terephthalate/cyclohexanedimethanol copolyesters with an I.V. of at least 0.2 can be used to prepare the copolyesters of this invention. Preferably, scrap polyethylene terephthalate with an I.V. of 0.3–0.6 is used. The acid portion of the polyethylene terephthalate or polyethylene terephthalate/cyclohexanedimethanol copolyester used in this invention may be modified with up to 30 mole % of other aliphatic, alicyclic or aromatic dicarboxylic acids such as isophthalic acid, 2,6-naphthalenedicarboxylic acid, cis or trans-1,4-cyclohexanedicarboxylic acid, monochloroterephthalic acid, dichloroterephthalic acid, methylterephthalic acid, dimethylterephthalic acid, 4,4'-diphenyldicarboxylic acid, adipic acid, azelaic acid, and dodecanedicarboxylic acid. No additional modifier is preferred.

The diol portion of the polyethylene terephthalate or polyethylene terephthalate/cyclohexanedimethanol copolyester used in this invention may be modified with up to 30 mole % of an aliphatic glycol such as 1,4-butanediol, 1,5-pentanediol, 1,6-hexanediol, or 2,2-dimethyl-1,3-propanediol. No additional modifier is preferred.

The copolymers of this invention are made by glycolysis of polyethylene terephthalate of polyethylene terephthalate/cyclohexanedimethanol copolyesters (preferably scrap polyester) with 1,4-cyclohexanedimethanol at about 275° C. The glycolysis can also be carried out on mixtures of polyethylene terephthalate and copolyesters of polyethylene terephthalate modified with about 3 to 80 mole % 1,4-cyclohexanedimethanol. A glycolysis temperature lower than 275° C. can be used, but the temperature must be above the melting point of the polyester so the polyester will be molten. Glycolysis temperatures as low as 200° C. can be used with the lower melting copolyesters under these conditions, or as high as about 290° C., but a temperature of about 275° C. is preferred. The glycolysis step is completed in the laboratory in about 5 min. if the glycolysis temperature is about 275° C. Longer times are required at lower temperatures. A vacuum of about 0.5 millimeter is then applied, and stirring is continued until a high-melt viscosity polymer is obtained. During this polycondensation step, ethylene glycol is eliminated. If the copolymer has a high enough crystalline melting point (at least about 200° C.), its molecular weight may be increased by heating particles of the polymer in an inert atmosphere or under reduced pressure at a temperature just below the softening point of the polymer by conventional solid-phase polymerization.

Using the melt process polyethylene terephthalate may be modified with 3 to 95 mole % 1,4-cyclohexanedimethanol and polyethylene terephthalate/cyclohexanedimethanol polyesters may be modified with up to 95 mole % 1,4-cyclohexanedimethanol. Since 1,4-cyclohexanedimethanol has a boiling point of about 285° C. and essentially none is lost during the polymerization, the theoretical amount of 1,4-cyclohexanedimethanol can be used in the preparation of the copolymers. The 1,4-cyclohexanedimethanol may be the cis or trans isomer, but the commercially available 30/70 cis/trans isomer mixture is preferred. Since a very short time is required to carry out glycolysis of the polyesters of this invention by the 1,4-cyclohexanedimethanol, the time needed to prepare the copolymers of this invention is considerably less than the time required to prepare the same copolymers by the conventional procedure, using dimethyl terephthalate, ethylene glycol, and 1,4-cyclohexanedimethanol.

The inherent viscosity of the copolyesters of this invention is at least 0.4 and preferably at least 0.6.

Tough films are obtained by pressing or by extrusion. Molding plastics having good properties are obtained by injection molding at about 240°–300° C., depending on the melting point of the copolyester. In addition to plastics, the compositions of this invention may be fabricated to give other types of shaped objects, such as foamed plastics, fibers, films, extruded shapes, and coatings. The compositions of this invention also may contain nucleating agents, fibers, pigments, glass fibers, asbestos fibers, antioxidants, plasticizers, lubricants, and other additives.

The following examples are submitted for a better understanding of the invention. All inherent viscosities are determined at 25° C. in a (60/40 by weight) mixture of phenol/tetrachloroethane at a concentration of 0.5 g/100 ml. The melting points and glass transition temperatures are determined with a Perkin-Elmer DSC-2 differential scanning calorimeter.

The 1,4-cyclohexanedimethanol used for glycolysis of the polyesters may be the cis or trans isomer, but the commercially available 30/70 cis/trans isomer ratio is used in the examples below.

The compositions are dried in an oven at 60° C. overnight and injection molded to give 2½×⅜×1/16-in. tensile bars and 5×½×⅛-ins. flexure bars for testing. ASTM procedures are used for measuring the tensile strength and elongation (ASTM D1708) flexural modules (ASTM D790) and Izod impact strength (ASTM D256 Method A).

EXAMPLE 1

This example illustrates the preparation of a copolyester from polyethylene terephthalate by modification with 30 mole % 1,4-cyclohexanedimethanol.

A mixture of 96.0 g (0.50 mole) of scrap polyethylene terephthalate (I.V. 0.70) and 31.9 g (0.155 mole) 70% 1,4-cyclohexanedimethanol/methanol solution is placed in a 500-ml flask equipped with a stirrer, a short distillation column and inlet for nitrogen. The flask is lowered into a metal bath maintained at 110° C. The mixture is heated under a nitrogen atmosphere with stirring to a temperature of 275° C. A very low melt viscosity product is obtained within 5 min. A vacuum of 0.3 millimeter of mercury is then applied over a period of 10 min. After stirring is continued under 0.3 millimeter of mercury at 275° C. for 44 min., a high-melt viscosity, very light gray polymer is obtained. The polymer has an inherent viscosity of 0.67 and a glass transition temperature of 77° C. Gas chromatographic analysis of the hydrolyzed polymer shows that the polymer contains 29.8% 1,4-cyclohexanedimethanol. Injection-molded bars have the following properties: tensile strength 6700 psi, elongation 150%, flexural modulus $2.7 \times 10^5$ psi and notched Izod impact strength 1.0 ft-lb/in. of notch. These properties are very similar to those obtained from the same copolymer prepared from dimethyl terephthalate, ethylene glycol, and 1,4-cyclohexanedimethanol.

EXAMPLE 2

This example illustrates the preparation of a copolymer from poly(ethylene terephthalate) and 5 mole % 1,4-cyclohexanedimethanol.

A copolymer is prepared with 0.5 mole of scrap polyethylene terephthalate (I.V. 0.32) and 0.025 mole (5 mole %) of 1,4-cyclohexanedimethanol by the procedure of Example 1. A clear, very light gray polymer is obtained. The polymer has an inherent viscosity of 0.53, glass transition temperature of 75° C. and crystalline melting point of 239° C. Gas chromatographic analyses of the hydrolyzed polymer shows that the polymer contains 5.5% 1,4-cyclohexanedimethanol.

EXAMPLE 3

This example illustrates the preparation of a copolymer from poly(ethylene terephthalate) and 90 mole % 1,4-cyclohexanedimethanol.

A copolymer is prepared with 0.5 mole of polyethylene terephthalate and 0.45 mole (90 mole %) of 1,4-cyclohexanedimethanol by the procedure of Example 1. A clear, very pale yellow polymer is obtained. The polymer has an inherent viscosity of 0.66, glass transition temperature of 86° C. and crystalline melting point of 255° C. Gas chromatographic analysis of the hydrolyzed polymer shows that the polymer contains 87.2 mole % 1,4-cyclohexanedimethanol.

EXAMPLE 4

This example illustrates the preparation of copoly(90/10 ethylene terephthalate/cyclohexylenedimethylene terephthalate) by reacting poly(ethylene terephthalate) and copoly(70/30 ethylene terephthalate/cyclohexylenedimethylene terephthalate) with 1,4-cyclohexanedimethanol.

A copolymer is prepared with 96 g (0.50 mole) polyethylene terephthalate, 21.6 g (0.10 mole) copoly(70/30 ethylene terephthalate/1,4-cyclohexylenedimethylene terephthalate) and 4.3 g (0.030 mole) 1,4-cyclohexanedimethanol by the procedure of Example 1. The polymer has an inherent viscosity of 0.52, glass transition temperature of 72° C. and melting point of 227° C. Gas chromatographic analysis of the hydrolyzed polymer shows that the polymer contains 10.1% 1,4-cyclohexanedimethanol.

EXAMPLE 5

This example illustrates the preparation of copoly(62/38 1,4-cyclohexylenedimethylene terephthalate/ethylene terephthalate) from copoly(70/30 ethylene terephthalate/cyclohexylene terephthalate) and 1,4-cyclohexanedimethanol.

A copolymer is prepared with 0.50 mole copoly(70/30 ethylene terephthalate/1,4-cyclohexylenedimethylene terephthalate) and 0.16 mole 1,4-cyclohexanedimethanol by the procedure of Example 1. A high-melt viscosity, clear, very pale yellow polymer is obtained having an I.V. of 0.64.

EXAMPLE 6

This example illustrates the preparation of copoly(87/13 ethylene terephthalate/1,4-cyclohexylenedimethylene terephthalate) by solid state polymerization.

A copolymer is prepared with 0.50 mole of poly(ethylene terephthalate) and 0.065 mole (13 mole %) of 1,4-cyclohexanedimethanol by the procedure of Example 1. The copolymer, obtained with an inherent viscosity of 0.61, is ground to pass a 20-mesh screen. Solid-state build-up is accomplished by heating the particles under reduced pressure (0.1 mm Hg) at 23°-200° C. over a period of 2 hr. and at 200° C. for 12 hr. the polymer has an inherent viscosity of 0.81 and a crystalline melting point of 219° C.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Process for preparing linear, high molecular weight copolyesters from polymers selected from the group consisting of (A) polyesters or copolyesters, the acid component of which consists of at least 70 mole percent terephthalic acid and the diol component of which consists of at least 70 mole percent ethylene glycol and (B) copolyesters, the acid component of which consists of at least 70 mole percent terephthalic acid and the diol component of which consists of at least 70 mole percent of a mixture of ethylene glycol and 1,4-cyclohexanedimethanol in a mole ratio of from 20:80 to 97:3, said process comprising
    (a) heating said polymer to a temperature of from about 200° C. to about 290° C. in the presence of about 3 mole percent to an amount equivalent to the mole percent of ethylene glycol of 1,4-cyclohexanedimethanol to thereby glycolize said polymer,
    (b) distilling out at least a portion of the ethylene glycol from the glycolysis mixture, and
    (c) polycondensing the glycolysis mixture to form a copolyester of which at least a portion of ethylene glycol units are replaced by 1,4-cyclohexanedimethanol units and the inherent viscosity is at least 0.4.

2. Process according to claim 1 wherein said polymer has an inherent viscosity of at least 0.6.

3. Process according to claim 2 wherein said polymer has an inherent viscosity of from about 0.4 to about 0.7.

4. Process according to claim 1 wherein said polymer is heated to a temperature of about 275° C. in step (b) and maintained at such temperature for a time of at least 5 minutes.

5. Process for preparing linear, high molecular weight copolyesters from polyesters or copolyesters, the acid component of which consists of at least 70 mole percent terephthalic acid and the diol component of which consists of at least 70 mole percent ethylene glycol which comprises
    (a) heating said polymer to a temperature of from about 200° C. to about 290° C. in the presence of about 3 mole percent to an amount equivalent to the mole percent of ethylene glycol of 1,4-cyclohexanedimethanol to thereby glycolize said polymer,
    (b) distilling out at least a portion of the ethylene glycol from the glycolysis mixture, and
    (c) polycondensing the glycolysis mixture to form a copolyester of which at least a portion of ethylene glycol units are replaced by 1,4-cyclohexanedimethanol units and the inherent viscosity is at least 0.4.

6. Process according to claim 5 wherein the acid component of said polyester or copolyester comprises from about 70 to about 99.5 mole percent terephthalic acid and from about 30 to about 0.5 mole percent of an aliphatic, alicyclic or aromatic dicarboxylic acid other than terephthalic.

7. Process according to claim 5 wherein the diol component of said polyester or copolyester comprises from about 70 to about 99.5 mole percent of ethylene glycol and from about 30 to about 0.5 mole percent of another aliphatic glycol having from 2 to 8 carbon atoms.

8. Process for preparing linear, high molecular weight copolyesters from copolyesters, the acid component of which consists of at least 70 mole percent terephthalic acid and the diol component of which consists of at least 70 mole percent of a mixture of ethylene glycol and 1,4-cyclohexanedimethanol in a mole ratio of from 20:80 to 97:3, said process comprising
    (a) heating said polymer to a temperature of from about 200° C. to about 290° C. in the presence of about 3 mole percent to an amount equivalent to the mole percent of ethylene glycol of 1,4-cyclohexanedimethanol to thereby glycolize said polymer,
    (b) distilling out at least a portion of the ethylene glycol from the glycolysis mixture, and
    (c) polycondensing the glycolysis mixture to form a copolyester of which at least a portion of ethylene glycol units are replaced by 1,4-cyclohexanedimethanol units and the inherent viscosity is at least 0.4.

9. Process according to claim 8 wherein the acid component of said polyester or copolyester comprises from about 70 to about 99.5 mole percent terephthalic acid and from about 30 to about 0.5 mole percent of an aliphatic, alicyclic or aromatic dicarboxylic acid other than terephthalic.

10. Process according to claim 8 wherein the diol component of said polyester or copolyester comprises from about 70 to about 99.5 mole percent of a mixture of ethylene glycol and 1,4-cyclohexanedimethanol in a mole ratio of from 20:80 to 97:3 and from about 30 to about 0.5 mole percent of another aliphatic glycol having from 2 to 8 carbon atoms.

* * * * *